United States Patent [19]
Veronesi

[11] Patent Number: 4,793,966
[45] Date of Patent: Dec. 27, 1988

[54] NUCLEAR REACTOR

[75] Inventor: Luciano Veronesi, Pittsburgh, Pa.

[73] Assignee: Westinghouse Electric Corp., Pittsburgh, Pa.

[21] Appl. No.: 178,801

[22] Filed: Mar. 29, 1988

Related U.S. Application Data

[63] Continuation of Ser. No. 490,097, Apr. 29, 1983.

[51] Int. Cl.$^4$ ............................................. G21C 15/00
[52] U.S. Cl. ....................................... 376/377; 376/399
[58] Field of Search .............. 376/290, 352, 353, 377, 376/389, 399, 406

[56] References Cited

U.S. PATENT DOCUMENTS

| 3,060,111 | 10/1962 | Sherman et al. | |
|---|---|---|---|
| 3,103,477 | 9/1963 | Mong | 376/399 |
| 3,178,356 | 4/1965 | Wheelock | 376/353 |
| 3,255,088 | 6/1966 | Sprague et al. | 376/353 |
| 3,481,832 | 12/1969 | Rickert | 376/353 |
| 3,660,231 | 5/1972 | Fox et al. | 376/353 |
| 3,725,199 | 4/1973 | Notari et al. | 376/352 |
| 3,861,999 | 1/1975 | Zmola et al. | 376/352 |
| 3,940,311 | 2/1976 | Frisch et al. | 376/353 |
| 4,173,513 | 11/1979 | Obermeyer et al. | 376/353 |
| 4,231,843 | 11/1980 | Myron et al. | 376/352 |
| 4,289,291 | 9/1981 | Goddard | 376/262 |
| 4,309,252 | 1/1982 | Gilroy | 376/290 |
| 4,659,539 | 4/1987 | Kimbrell et al. | 376/377 |
| 4,681,728 | 7/1987 | Veronesi et al. | 376/399 |
| 4,716,013 | 12/1987 | Veronesi et al. | 376/353 |

FOREIGN PATENT DOCUMENTS 1497755  1/1978  United Kingdom ............... 376/290

Primary Examiner—Charles T. Jordan
Assistant Examiner—Richard W. Wendtland

[57] ABSTRACT

A nuclear reactor in which rupture by fatigue of the components of the control-rod assemblies is precluded. The fatigue is caused by the vibration of the components or cavitation under the action of the coolant flowing at a high velocity transversely to the control-rod assemblies. A perforated shroud is provided between the control rod assemblies and the outlet nozzles. The shroud distributes the transversely-flowing coolant over a large volume so that its velocity is substantially lower than the resonant velocity at which vibrations of substantial amplitude of the components or cavitation is produced.

12 Claims, 6 Drawing Sheets

NUCLEAR REACTOR

This application is a continuation, of application Ser. No. 490,097, filed Apr. 29, 1983.

BACKGROUND OF THE INVENTION

This invention relates to nuclear reactors and has particular relationship to reactors in which a coolant, typically water at critical temperature and pressure, is circulated through the nuclear core. The core includes the fuel and is disposed in the lower region of the reactor vessel. In addition, the reactor includes control-rod assemblies. Control-rod assemblies include control rods, supports for the control rods, drive rods for the control rods and guides for the control rods and, in some reactors, other related components. The core with its fuel assemblies is usually referred to as the lower internals of the reactor. The control-rod drives and guides are referred to as the upper internals of the reactor. The control rods are movable by the drive rods between the upper internals and recesses or thimbles in the core.

The control rods are mounted in clusters on their supports. There are rod clusters (RCC's) in which the rods have a high absorption cross-section for neutrons. These clusters are used to reduce the power or shut down the reactor and are moved between the core and their guides a number of times during the fuel cycle of a reactor. There are so-called grey control rods of substantially lower neutron absorption cross-section than the high-absorption RCC's and they serve for load follow or to moderate or control the power of the reactor. Grey rods are moved between the core and the guides many times (typically 5,600), substantially more than the high-absorption RCC's, during the fuel cycle of a reactor. There are water displacement rod clusters (WDRC'S). These rods are approximately of the same diameter as the RCC's. Their function is to displace the coolant, which may penetrate into the thimbles that do not receive control rods or grey rods. The water operates as a moderator. The coolant may be light water as in a PWR but it may also be liquid metal or heavy water. WDRC clusters are in the core during earlier operation, typically during the first 60% of the fuel cycle, and are raised into the upper internals during the remainder, typically 40% of the fuel cycle. Typically the control rods are tubular. In this application and in its claims, the expression "control-rods", unless modified by wording signifying a specific type of rod, means any or all of the above-described control rods.

Typically, the RCC's and the grey rods in their clusters are carried by cruciform supports and are movable inside of hollow curciform guides. These guides conventionally have slots through which coolant flows. The WDRC's are not so protected. A large number of these tubes are movable in rectangular or square guides which conventionally have holes through which the coolant flows. During the later part of the fuel cycle, the WDRC's are moved into and remain in perforated guides. All guides are part of the upper internals of the reactor.

The coolant flows vertically through the core and into the upper internals. The outlet nozzles of the vessel are disposed between the ends of the upper internals and they conduct the coolant horizontally. The coolant then flows generally horizontally or transversely through the control-rod assemblies in passing to the nozzles. Typically the vertical flow of the coolant through the core has a velocity of about 24 ft/sec. The flow through the nozzles in prior art apparatus has a velocity of about 50 ft/sec and the flow through some regions of the upper internals in prior art reactors may be as high as 30 or 40 ft/sec. At these velocities, the coolant causes thee vertical members and particularly the WDRC's, during the later part of the fuel cycle, to vibrate. At resonance velocities, the amplitude of vibration of the vertical members may be of the order of an inch or more. At higher velocities there is cavitation. The vertical members of the upper internals and particularly the WDRC's are subject to failure by reason of fatigue by the continuous vibrations induced by the transverse flow and by the stresses induced by cavitation.

It is an object of this invention to prevent failure of the components of the control-rod assemblies and particularly of the WDRC's by reason of the transverse flow of the coolant.

SUMMARY OF THE INVENTION

In accordance with this invention failure of the components of the control-rod assemblies is prevented by reducing the velocity of the transversely-flowing coolant to alow magnitude such that neither appreciable vibration of the components nor cavitation occurs. This magnitude is substantially lower than the resonant magnitude for the components involved. Typically this velocity is about 5 ft/sec.

This invention arises from the realization that, in prior art reactors, the coolant, in flowing transversely through the control rod assemblies, is predominantly channeled directly through the outlet nozzles over a relatively small volume of the guides. This channeling increases the velocity of the coolant substantially as it flows over the guides. The velocity is accordingly reduced to the low magnitude by expanding the volume of the transversely-flowing coolant. A perforated shroud is interposed between the nozzles and the upper internals. This shroud and associated components are so structured, in the light of pressure gradations in the outflowing coolant, that the outflow takes place over the whole surface of the shroud, correspondingly expanding the volume of the outflow.

BRIEF DESCRIPTION OF THE DRAWINGS

For a better understanding of this invention, both as to its organization and as to its method of operation, together with additional objects and advantages thereof, reference is made to the following description takin in connection with the accompanying drawings, in which.

DETAILED DESCRIPTION OF THE EMBODIMENTS

Figure 1:
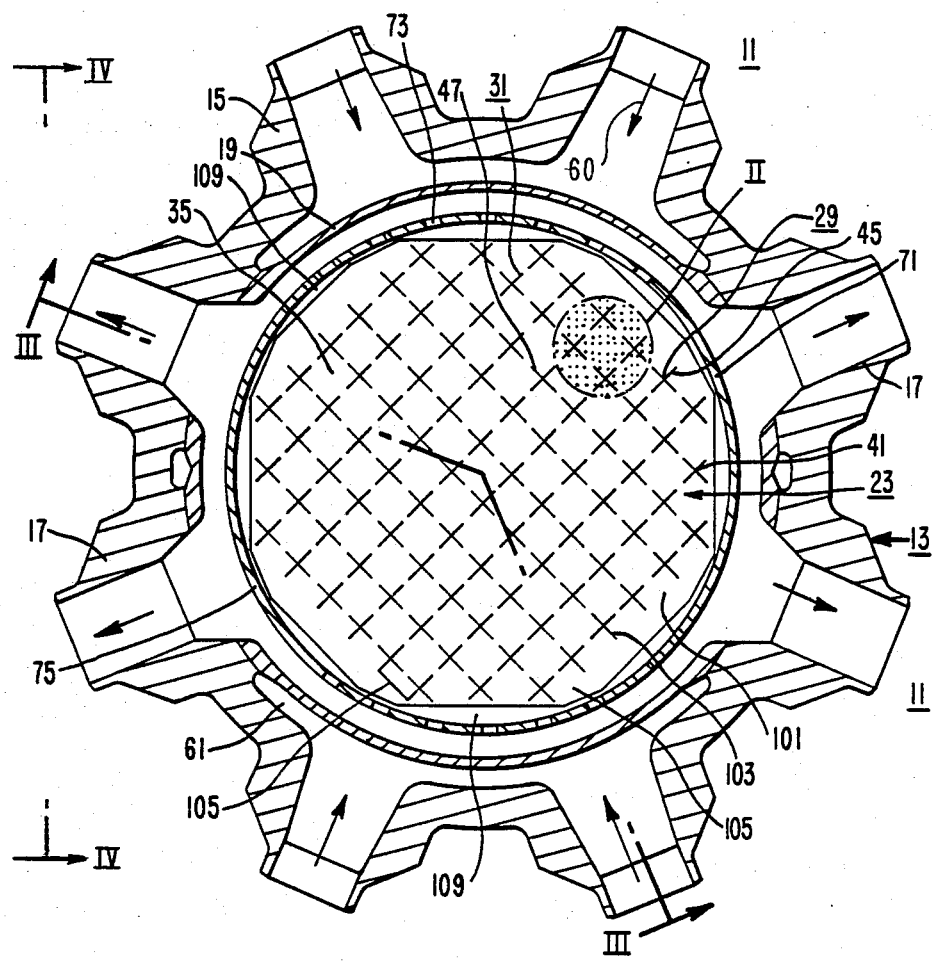
FIG. 1 is a view in transverse section of an embodiment of this invention.

The apparatus shown in the drawings is a nuclear reactor 11. The reactor 11 is of the light-water pressurized type (PWR). A PWR is presented here only for the purpose of describing this invention with reference to a concrete embodiment. To the extent that this invention is applicable to reactors of other types, such as boiling-water, liquid-metal, or heavy-water reactors, such application is within the scope of this invention.

The reactor 11 includes a pressure-tight vessel 13 of conventional construction. The vessel 13 includes a plurality of inlet nozzles 15 for conducting the coolant into the vessel 13 and a plurality of outlet nozzles 17 for conducting coolant out of the vessel. Typically, as shown, there are two pairs of two inlet nozzles 15 each, and two pairs of two outlet nozzles 17 each, interposed between the inlet nozzles. A shell section 19 is sealed (welded) to the inner wall of the vessel opposite each pair of inlet nozzles 15. The shell sections 19 prevent the coolant from being injected into the upper regions of the vessel, essentially guiding the coolant to the lower regions of the vessel.

Figure 2:
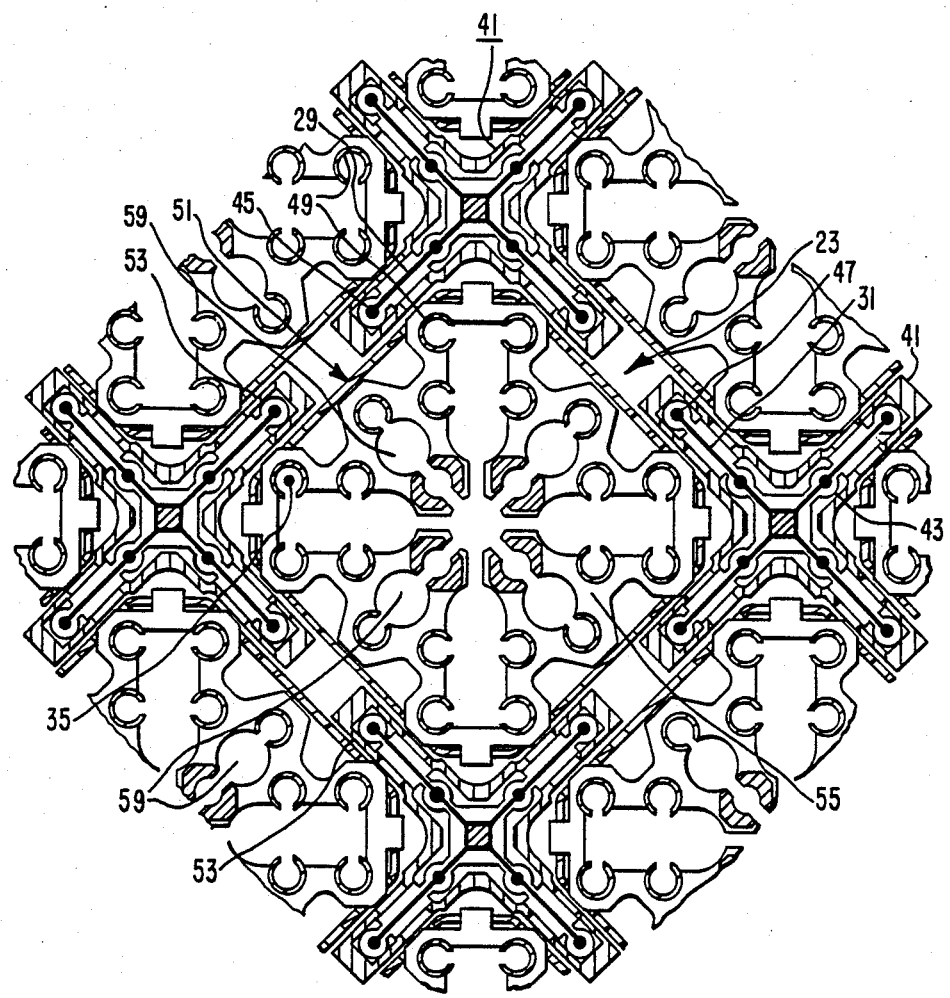
FIG. 2 is an enlarged fragmental view of the portion of FIG. 1 contained in circle II.
Figure 3:
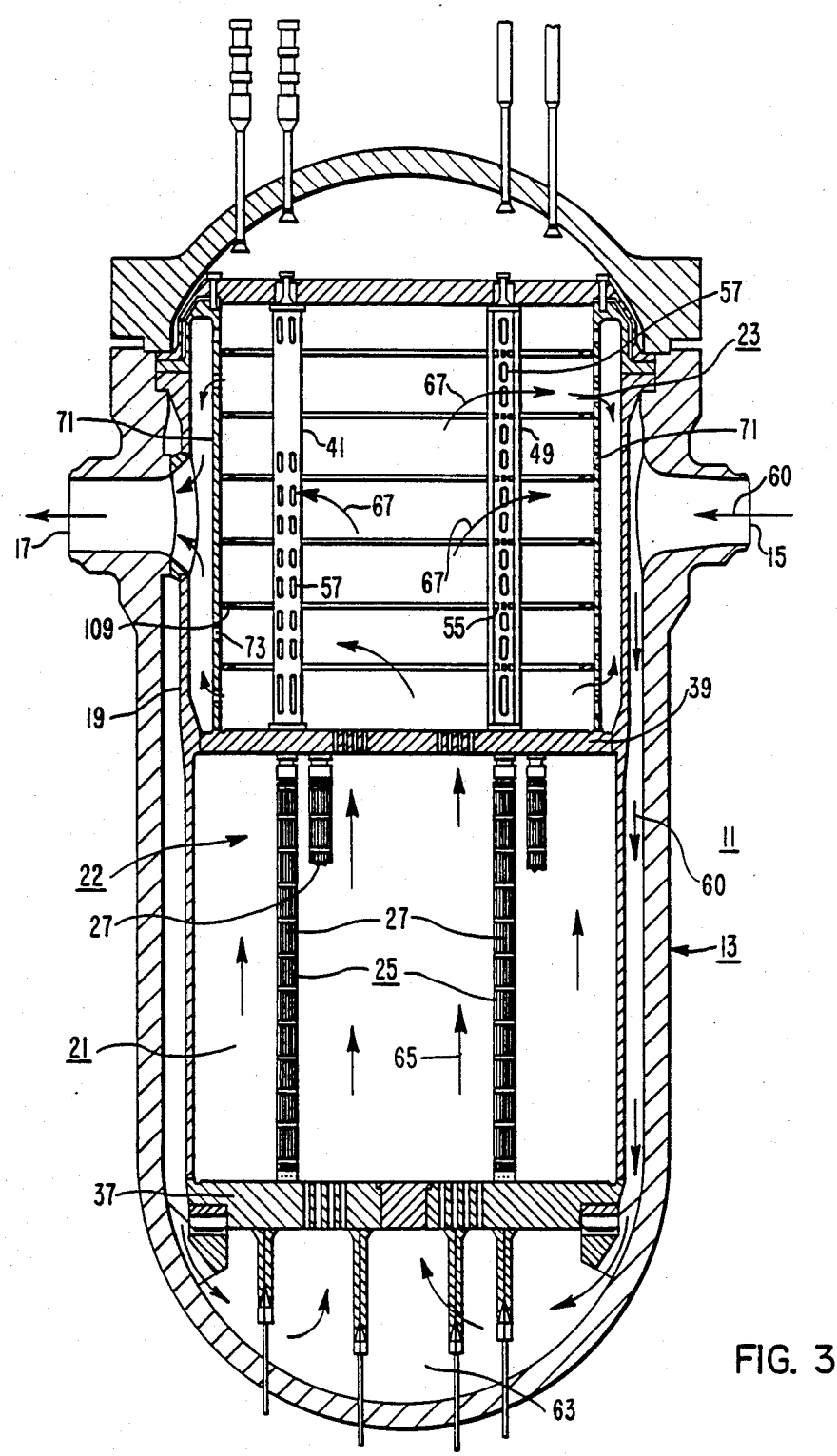
FIG. 3 is a view in longitudinal section taken along line III—III of FIG. 1.

Within the vessel there are the lower internals 21 (FIG. 3), which include the nuclear core 22, and the upper internals 23. The core 22 includes the fuel assemblies 25 which include thimbles 27 for receiving the neutronabsorbing rod control clusters 29, the grey rod control clusters 31 and the water displacement control-rod clusters 35 (FIG. 2). The fuel assemblies 25 are mounted between upper and lower supports 39 and 37 which are sometimes referred to as upper and lower core plates. The structure of the lower internals 21 is conventional.

The upper internals (FIGS. 1, 2) include the cruciform guides 41 for the RCC's and for the grey rods. These guides 41 include a plurality of plates 43 which extend vertically from the walls of the arms of the cruciforms 41 and which are formed to guide the RCC's 45 or grey rods 47 (FIG. 1). The guides 49 for the WDRC's 35 are contained within generally square or rectangular shells 51. The sides of each shell 51 are parallel to and extend along inwardly extending arms 53 of four adjacent cruciform guides 45 or 47. The guides 49 are formed in plates 55 which extend vertically along the shells 51. The cruciform guides 41 and the shells 51 have slots 57 (FIG. 3) through which coolant flows. The plates 55 also have holes 59 (FIG. 2) which are penetrated by coolant.

In this application and in its claims, the cooperative parts or assemblies of the reactor, including the guides 41 and 49, the shell 51, the WDRC's 35, the RCC's 45, and the grey rods 47, are referred to as controlrod assemblies. In the normal operation of a nuclear reactor, during the earlier part of the fuel cycle, the WDRC's 35 are in the core 22, the RCC's 45 are in the upper internals and the positions of the grey rods 47 are dependent on the loading.

The coolant flows inwardly through the inlet nozzles 15 as depicted by the arrows 60 (FIGS. 1,3) and through the annular sections 61 between the sections 19 and the wall of vessel 13. In this annular section, the coolant is guided downwardly into plenum 63 (FIG. 2) whence the coolant flows upwardly through lower core plate 37, the core 22 and the upper core plate 39, as depicted by the arrows 65. The coolant then flows into the upper internals, out of the guides, and out through the outlet nozzles 17. In the region of the upper internals 23 the flow is deflected at right angles and the coolant flows through the upper internals generally transversely, as depicted by the arrows 67. Coolant flowing at a high speed transversely to the guides 41 and 49 and shells 51 of the upper internals and the WDRC's 35, as occurs in apparatus in accordance with prior-art teaching, would cause these components to vibrate or be subject to high stress and to fail.

Figure 4:
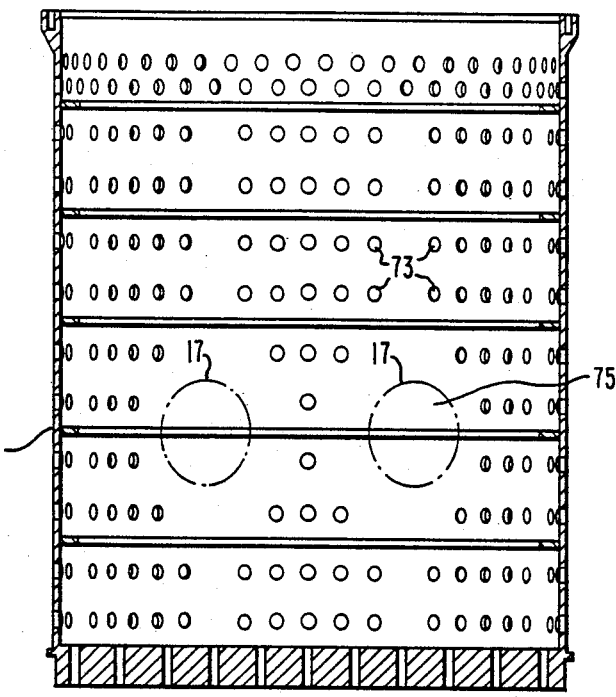
FIG. 4 is a view in side elevation taken in the direction IV—IV of FIG. 1 showing the shroud used in the practice of this invention.
Figure 6:
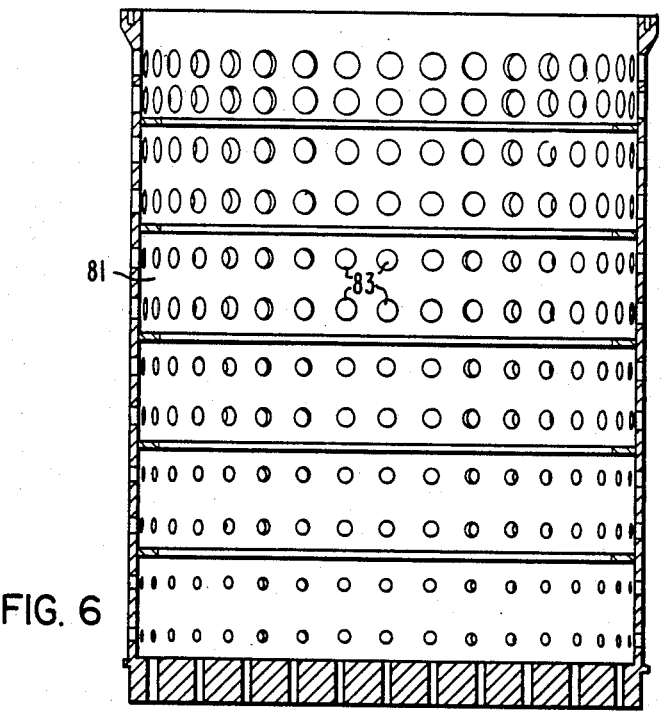
FIG. 6 is a view in side elevation showing a shroud in accordance with a modification of this invention.
Figure 7:
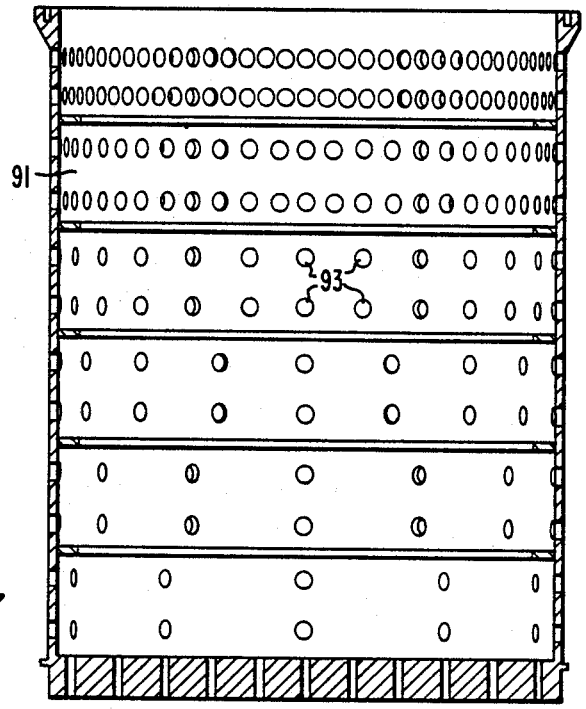
FIG. 7 is a view in side elevation showing a shroud in accordance with another modification of this invention.

The upper internals 23 are encircled by a shroud 71 (FIGS. 1,3,4,5) which is interposed between the upper internals and the nozzles 15 and 17. The shroud 71 has holes 73 except in the regions 75 opposite the outlet nozzles 17 as shown in FIG. 4. Flow of coolant directly through the outlet nozzles 71 is thus prevented. In the shroud 71, shown in FIG. 4, the holes 73 are generally of the same area and are generally equally spaced except in the regions 75. In the shroud 81, shown in FIG. 6, the holes 83 progressively increase in area vertically from the bottom of the shroud to the top. In the shroud 91, shown in FIG. 7, the holes 93 are of the same area but increase in number progressively vertically from the bottom to the top. The concepts of FIG. 6 and FIG. 7 may be combined. The holes 93 may increase progressively in number and area from the bottom to the top.

In the interest of clarity, hole-free regions which are opposite the outlet nozzles 17 are not shown. Shrouds 81 and 91 include such regions.

Figure 5:
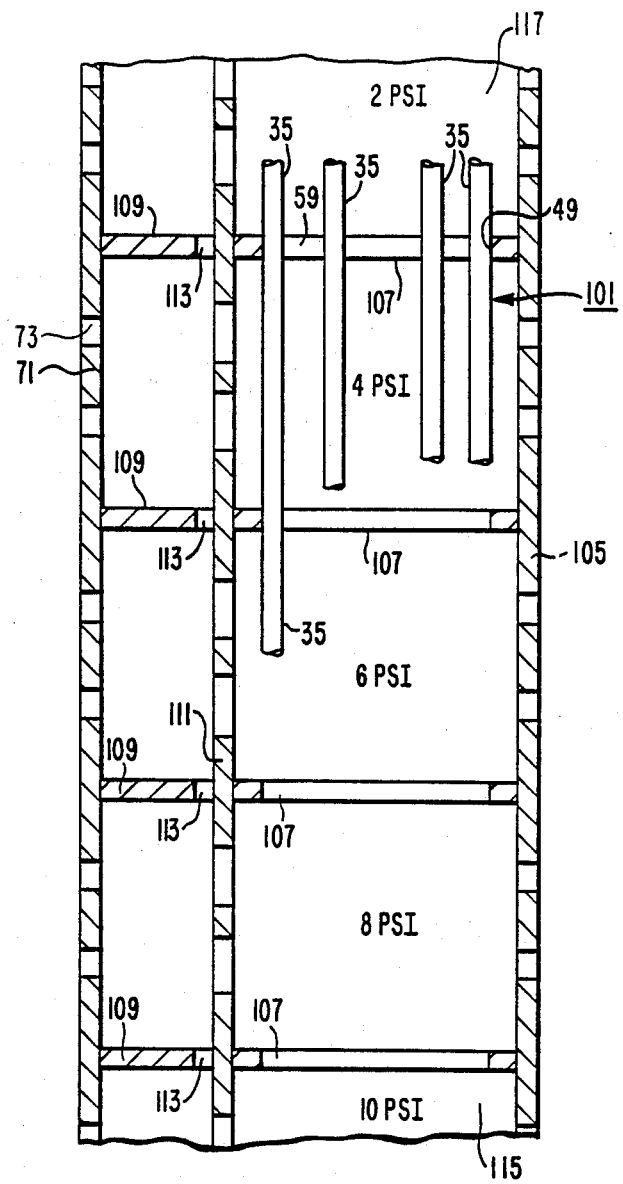
FIG. 5 is a fragmental, generally diagrammatic view in longitudinal section illustrating an aspect of this invention.

At the periphery of the internals, the groups 101 of residual WDRC's extend only between two or three outer arms 103 (FIG. 1) of the cruciform grinder. These peripheral WDRC groups are enclosed in irregularly shaped shells 105 (FIGS. 1,5). The shells 105 have correspondingly shaped plates 107.

Annular plates or barriers 109 extend vertically between the shroud 71 and the outer walls 111 of the peripheral shells. There is a small gap 113 between each plate and the wall 111.

The purpose of these barriers is illustrated in FIG. 5. The coolant confined by the plates 107 decreases in pressure progressively in pressure from the lower region 115 defined by the plates 107 to the upper region 117. Different pressures are depicted in FIG. 5 for illustrative purposes. In the absence of the barriers 109, the high pressure at the bottom would drive the coolant to the upper region of the space between the shroud 71 and the peripheral shells, limiting the volume flowing transversely to the control-rod assemblies and increasing the velocity of the coolant. The barriers 109 preclude such flow.

In the practice of this invention the outflowing coolant is distributed over a large volume and its velocity is reduced to a low magnitude.

While preferred embodiments of this invention have been disclosed herein, many modifications thereof are feasible. This invention is not to be restricted except insofar as is necessitated by the spirit of the prior art.

I claim:

1. The method of operating a nuclear reactor having a vessel, a nuclear core within said vessel, at least an inlet nozzle and an outlet nozzle, and control-rod assemblies within a plenum within said vessel; the said method including: conducting a coolant in sequence generally vertically through said core and generally vertically and generally transversely through said control-rod assemblies in said plenum, said coolant flowing at a high velocity through said core, reducing the velocity of said coolant as it flows through said plenum by the step of expanding the volume through which said coolant flows through said plenum over substantially the whole volume of said plenum, said volume-expanding step including the step of compensating for the pressure variation of said coolant along said plenum between the generally lower regions of said plenum and the generally upper regions of said plenum, and thereafter conducting said coolant through said outlet nozzle.

2. The method of claim 1 wherein the volume-expanding step also includes the step of suppressing the direct flow of coolant from the plenum through the outlet nozzle.

3. The method of claim 1 wherein the reactor includes a shroud interposed between the control-rod assemblies and the outlet nozzle and wherein the volume-expanding step includes the step of suppressing the flow of the coolant into and generally vertically through the channel between the outer boundary of the control assemblies and the shroud under the pressure laterally of the coolant in the generally vertically lower regions of the plenum.

4. A nuclear reactor including a vessel, a nuclear core within said vessel, said vessel having at least an inlet nozzle and an outlet nozzle for circulating coolant through said core, control-rod assemblies within said vessel, said control-rod assemblies including control rods movable between a plenum above said core and receptors within said core, drive rods for said control rods and guide means for said control rods within said plenum, the in-flowing coolant, after passing through said core, flowing generally upwardly and generally transversely through said plenum to said outlet nozzle in the operation of said reactor, the pressure of said coolant decreasing progressively in said plenum as said coolant flows generally upwardly therethrough, and a shroud interposed between said guide means and said outlet nozzle in the path of said transversely-flowing coolant, said shroud encircling said guide means and having holes along substantially the whole extent thereof providing passage to said outlet nozzle for said transversely-flowing coolant, the areas of said holes in said shroud increasing progressively from its generally vertically lower region to its generally vertically upper region in accordance with said variation in pressure of said coolant between said generally lower region and said generally upper region of said plenum to preclude concentration of said coolant by the higher pressure in the generally lower regions of said shroud, and said holes being so distributed over said shroud that the transversely flowing coolant is distributed over the whole surface of said shroud, whereby the velocity of said transversely-flowing coolant is reduced to a magnitude substantially below the magnitude at which said transversely-flowing coolant would cause said control rods, said drive rods or said guide means to be subject to metal fatigue.

5. A nuclear reactor including a vessel, a nuclear core within said vessel, said vessel having at least an inlet nozzle and an outlet nozzle for circulating coolant through said core, control-rod assemblies within said vessel, said control-rod assemblies including control rods movable between a plenum above said core and receptors within said core, drive rods for said control rods and guide means for said control rods within said plenum, the in-flowing coolant, after passing through said core, flowing generally transversely through said plenum to said outlet nozzle in the operation of said reactor, a shroud interposed between said guide means and said outlet nozzle in the path of said transversely-flowing coolant, said shroud encircling said guide means and having holes along substantially the whole extent thereof providing passage to said outlet nozzle for said transversely-flowing coolant, said holes being so distributed over said shroud and/or so dimensioned that the transversely-flowing coolant is distributed over the whole surface of said shroud, whereby the velocity of said transversely-flowing coolant is reduced to a magnitude substantially below the magnitude at which said transversely-flowing coolant would cause said control rods, said drive rods or said guide means to be subject to metal fatigue, and barrier plates extending annularly between said shroud and said guide means along the vertical length of said shroud and guide means to suppress axial flow of coolant in the annular region between said shroud and said guide means under pressure of the transversely-flowing coolant.

6. The nuclear reactor of claim 5 wherein the guide means includes support plates extending vertically along the guide means, and the barrier plates are located substantially at the same level as said support plates.

7. A nuclear reactor including a vessel, a nuclear core within said vessel, said vessel having at least an inlet nozzle and an outlet nozzle for circulating coolant through said core, control-rod assemblies within said vessel, said control-rod assemblies including control rods movable between a plenum above said core and receptors within said core, drive rods for said control rods and guide means for said control rods within said plenum, the in-flowing coolant, after passing through said core, flowing generally transversely through said plenum to said outlet nozzle in the operation of said reactor, and a shroud interposed between said guide means and said outlet nozzle in the path of said transversely-flowing coolant, said shroud encircling said guide means and having holes along substantially the whole extent thereof except along a limited region thereof generally opposite said outlet nozzle thereby producing indirect passage of said transversely-flowing coolant but suppressing direct flow of said transversely-flowing coolant from said control-rod assemblies through said outlet nozzle, said holes being otherwise so distributed over said shroud and/or so dimensioned that the transversely-flowing coolant is distributed over the whole surface of said shroud, whereby the velocity of said transversely-flowing coolant is reduced to/magnitude substantially below the magnitude at which said transversely-flowing coolant would cause said control rods, said drive rods or said guide means to be subject to metal fatigue.

8. A nuclear reactor including a vessel, a nuclear core within said vessel, said vessel having at least an inlet nozzle and an outlet nozzle for circulating coolant through said core, control-rod assemblies within said vessel, said control-rod assemblies including control rods movable between a plenum above said core and receptors within said core, drive rods for said control rods and guide means for said control rods within said plenum, the in-flowing coolant, after passing through said core, flowing generally upwardly and generally transversely through said plenum to said outlet nozzle in the operation of said reactor, the pressure of said coolant in said plenum decreasing progressively as said coolant flows generally upwardly therethrough, and a shroud interposed between said guide means and said outlet nozzle in the path of said transversely-flowing coolant, said shroud encircling said guide means and having holes along substantially the whole extent thereof providing passage to said outlet nozzle for said transversely-flowing coolant, the numbers of said holes in said shroud increasing progressively from its generally vertically lower region to its generally vertically upper region in accordance with said variation of said pressure of the coolant between said generally lower region and said generally upper region of said plenum to preclude concentration of the coolant by the higher pressure in the lower areas of said shroud, said holes being otherwise so distributed over said shroud that the transversely-flowing coolant is distributed over the whole surface of said shroud, whereby the velocity of said transversely-flowing coolant is reduced to a magnitude substantially below the magnitude at which said transversely-flowing coolant would cause said control rods, said drive rods or said guide means to be subject to metal fatigue.

9. A nuclear reactor including a vessel, a nuclear core within said vessel, said vessel having at least an inlet nozzle and an outlet nozzle for circulating coolant through said core, control-rod assemblies within said vessel, said control-rod assemblies including control rods movable between a plenum above said core and receptors within said core, drive rods for said control rods and guide means for said control rods within said plenum, the in-flowing coolant, after passing through said core, flowing generally upwardly and generally transversely through said plenum to said outlet nozzle in the operation of said reactor, the pressure of said coolant decreasing progressively in said plenum as said coolant flows generally upwardly through said plenum, and a shroud interposed between said guide means and said outlet nozzle in the path of said transversely-flowing coolant, said shroud encircling said guide means and having holes along substantially the whole extent thereof providing passage to said outlet nozzle for said transversely-flowing coolant, the areas of the holes in said shroud increasing progressively from its generally vertically lower region to its generally vertically upper region in accordance with said variations of said pressure of said coolant between said generally lower region and said generally upper region of said plenum to preclude concentration of said coolant by the higher pressure in the generally lower region of said shroud.

10. A nuclear reactor including a vessel, a nuclear core within said vessel, said vessel having at least an inlet nozzle and an outlet nozzle for circulating coolant through said core, control-rod assemblies within said vessel, said control-rod assemblies including control rods movable between a plenum above said core and receptors within said core, drive rods for said control rods and guide means for said control rods within said plenum, the in-flowing coolant, after passing through said core, flowing generally upwardly and generally transversely through said plenum to said outlet nozzle in the operation of said reactor, the pressure of said coolant in said plenum decreasing progressively as said coolant flows generally upwardly therethrough, and a shroud interposed between said guide means and said outlet nozzle in the path of said transversely-flowing coolant, said shroud encircling said guide means and having holes along substantially the whole extent thereof providing passage to said outlet nozzle for said transversely-flowing coolant, the number of holes in said shroud increasing progressively from its generally vertically lower region to its generally vertically upper region in accordance with the variation in the pressure of said coolant between said generally lower region and said generally upper region of said plenum to preclude concentration of said coolant by the higher pressure in the lower region of said shroud.

11. A nuclear reactor including a vessel, a nuclear core within said vessel, said vessel having at least an inlet nozzle and an outlet nozzle for circulating coolant through said core, control-rod assemblies within said vessel, said control-rod assemblies including control rods movable between a plenum above said core and receptors within said core, drive rods for said control rods and guide means for said control rods within said plenum, the in-flowing coolant, after passing through said core, flowing generally transversely through said plenum to said outlet nozzle in the operation of said reactor, and a shroud interposed between said guide means and said outlet nozzle in the path of said transversely-flowing coolant, said shroud encircling said guide means and having holes along substantially the whole extent thereof providing passage to said outlet nozzle for said transversely-flowing coolant, said holes being so distributed over said shroud and/or so dimensioned that direct flow of said transversely-flowing coolant from said plenum through said shroud and through said outlet nozzle is suppressed and the transversely-flowing coolant is distributed over the whole surface of said shroud flowing into said outlet nozzle indirectly, whereby the velocity of said transversely-flowing coolant is reduced to a magnitude substantially below the magnitude at which said transversely-flowing coolant would cause said control rods, said drive rods or said guide means to be subject to metal fatigue.

12. A nuclear reactor including a vessel, a nuclear core within said vessel, upper internals within said vessel above said core, said vessel having at least an inlet nozzle and an outlet nozzle for circulating coolant through said core, control-rod assemblies including control rods movable between said upper internals above said core and receptors within said core, said upper internals including drive rods for said control rods and guide means for said control rods, the in-flowing coolant, after passing through said core, flowing generally transversely through said upper internals to said outlet nozzle in the operation of said reactor, and means, interposed between said upper internals and said outlet nozzle, for suppressing direct flow of said coolant from said upper internals through said outlet nozzle and for otherwise distributing said transversely-flowing coolant over the volume extending substantially throughout the length of said guide means and conducting said transversely-flowing coolant indirectly through said nozzle, the said distributing means being so structured that, the velocity of said transversely-flowing coolant is reduced to a magnitude substantially below the magnitude at which said transversely-flowing coolant would cause said control rods, said drive rods or said guide means to be subject to metal fatigue.

* * * * *